United States Patent
Blackwell, Jr. et al.

(10) Patent No.: US 9,575,275 B2
(45) Date of Patent: Feb. 21, 2017

(54) FIBER OPTIC MODULES WITH PUSHROD ACTIVATED LATCHES AND APPARATUSES FOR RELEASABLY ATTACHING FIBER OPTIC MODULES TO EQUIPMENT

(71) Applicant: CORNING OPTICAL COMMUNICATIONS LLC, Hickory, NC (US)

(72) Inventors: Chois Alven Blackwell, Jr., North Richland Hills, TX (US); Terry Dean Cox, Fort Worth, TX (US); Jorgen Sven Janson, Berlin (DE); Sebastian Schreiber, Berlin (DE); Howard Clark Schwartz, Dallas, TX (US)

(73) Assignee: Corning Optical Communications LLS, Hickory, NC (US)

( * ) Notice: Subject to any disclaimer, the term of this patent is extended or adjusted under 35 U.S.C. 154(b) by 0 days.

(21) Appl. No.: 14/730,541

(22) Filed: Jun. 4, 2015

(65) Prior Publication Data
US 2015/0268435 A1    Sep. 24, 2015

Related U.S. Application Data

(63) Continuation of application No. PCT/US2013/072708, filed on Dec. 3, 2013.
(Continued)

(51) Int. Cl.
*G02B 6/44* (2006.01)
*G02B 6/38* (2006.01)

(52) U.S. Cl.
CPC .......... *G02B 6/4455* (2013.01); *G02B 6/4452* (2013.01); *G02B 6/4453* (2013.01); *G02B 6/4454* (2013.01);
(Continued)

(58) Field of Classification Search
CPC ............................. G02B 6/4455; G02B 6/4452
See application file for complete search history.

(56) References Cited

U.S. PATENT DOCUMENTS

| 5,530,954 A | 6/1996 | Larson et al. ............... 385/135 |
| 6,259,851 B1 | 7/2001 | Daoud ......................... 385/135 |

(Continued)

FOREIGN PATENT DOCUMENTS

| EP | 2159615 A2 | 3/2010 | ............... G02B 6/44 |
| JP | 3107704 U | 2/2005 | ............... G02B 6/00 |

(Continued)

OTHER PUBLICATIONS

Patent Cooperation Treaty, International Search Report for PCT/US2013/072706, mail date Feb. 17, 2014, 4 pages.
(Continued)

*Primary Examiner* — Jerry Rahll

(57) ABSTRACT

An apparatus for releasably attaching a fiber optic module to equipment is disclosed. The apparatus comprises a latch configured to releasably attach the fiber optic module to equipment. The apparatus further comprises a pushrod configured to deactivate the latch from a back end of the fiber optic module, wherein the fiber optic module is released from the equipment. In one embodiment, the fiber optic module is a high-density fiber optic module. The pushrod may be further configured to maintain a position of the latch. The pushrod may also be further configured to be positioned in a groove disposed in a side of a main body of the fiber optic module, wherein the pushrod and the groove are configured to prevent the pushrod from binding while moving within the groove.

21 Claims, 16 Drawing Sheets

Related U.S. Application Data

(60) Provisional application No. 61/791,294, filed on Mar. 15, 2013, provisional application No. 61/734,655, filed on Dec. 7, 2012.

(52) U.S. Cl.
CPC ............ *G02B 6/3897* (2013.01); *Y10T 403/60* (2015.01); *Y10T 403/602* (2015.01)

(56) References Cited

U.S. PATENT DOCUMENTS

| | | |
|---|---|---|
| 6,647,197 B1 | 11/2003 | Marrs et al. ................ 385/134 |
| 8,326,107 B2 | 12/2012 | Cooke et al. ............... 385/135 |
| 2005/0100302 A1 | 5/2005 | Schray ....................... 385/135 |
| 2007/0172192 A1 | 7/2007 | Smrha et al. ............... 385/135 |
| 2010/0061693 A1 | 3/2010 | Bran de Leon et al. .... 385/135 |
| 2010/0322582 A1 | 12/2010 | Cooke et al. ............... 385/135 |
| 2011/0150407 A1 | 6/2011 | Beamon et al. ............ 385/135 |
| 2011/0268415 A1 | 11/2011 | Fabrykowski et al. ..... 385/135 |

FOREIGN PATENT DOCUMENTS

| | | | |
|---|---|---|---|
| WO | WO2011/112764 A1 | 9/2011 | ............ G02B 6/44 |
| WO | WO2012/047390 A1 | 4/2012 | ............ G02B 6/44 |

OTHER PUBLICATIONS

Patent Cooperation Treaty, International Search Report for PCT/US2013/072708, mail date Mar. 13, 2014, 4 pages.

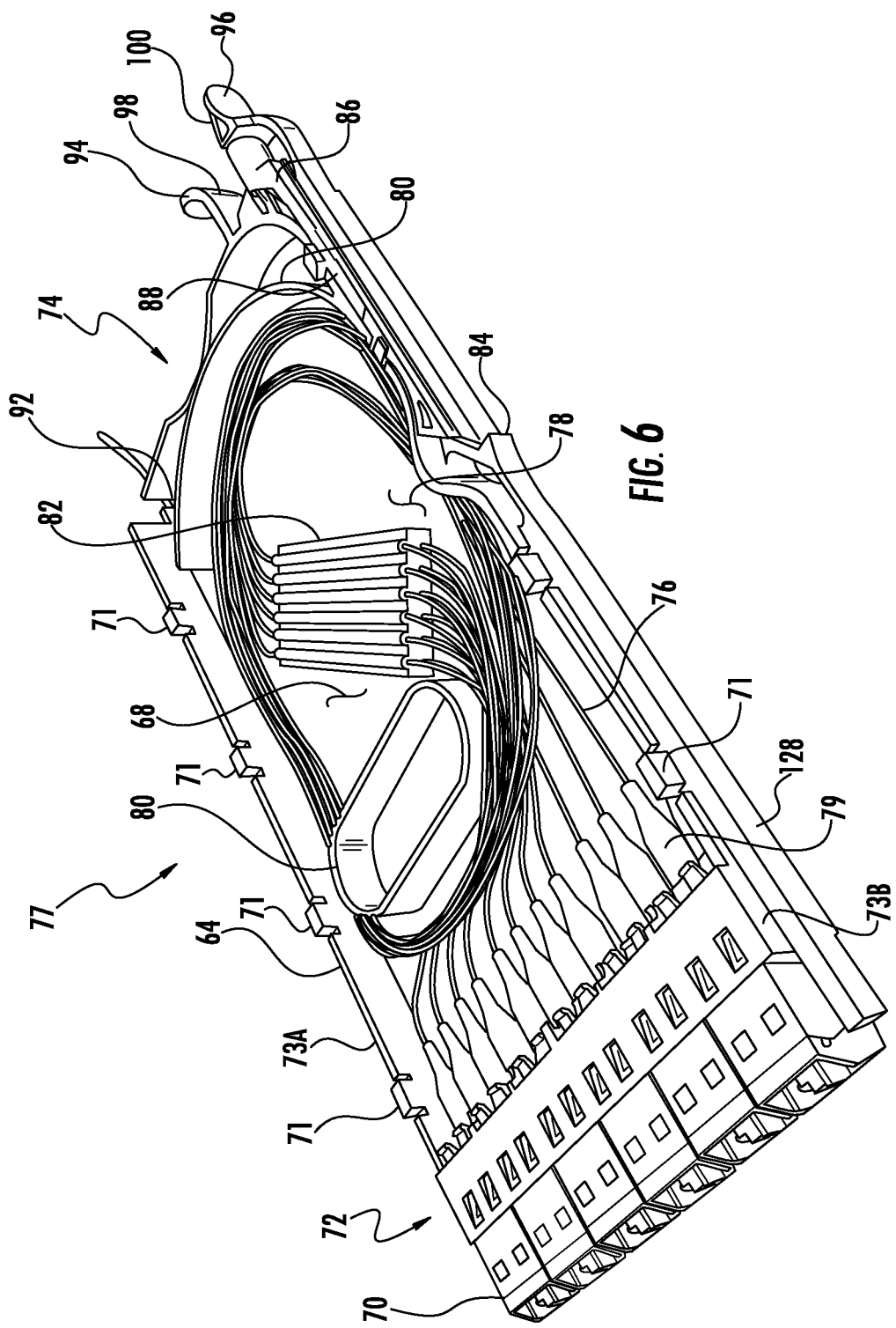

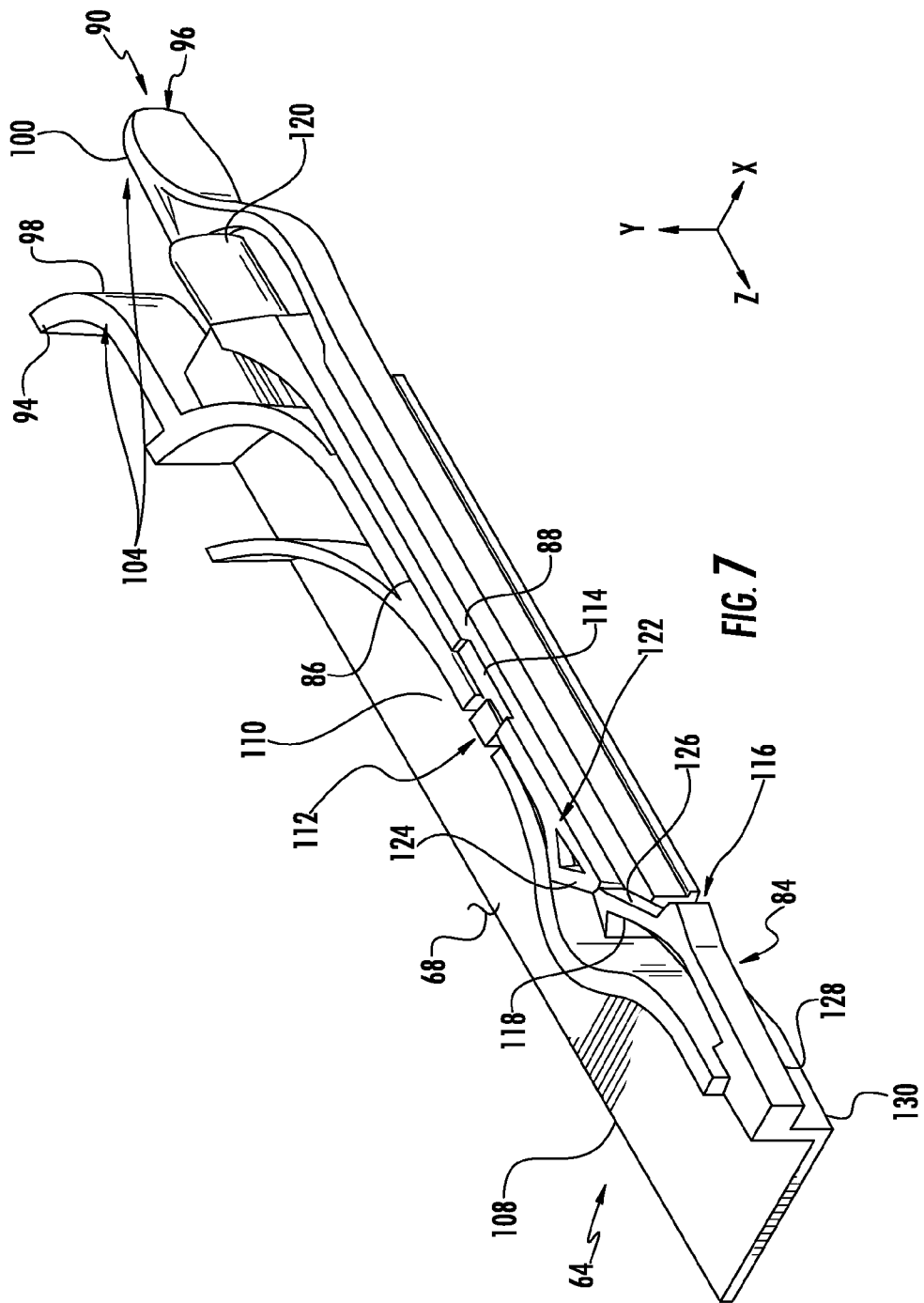

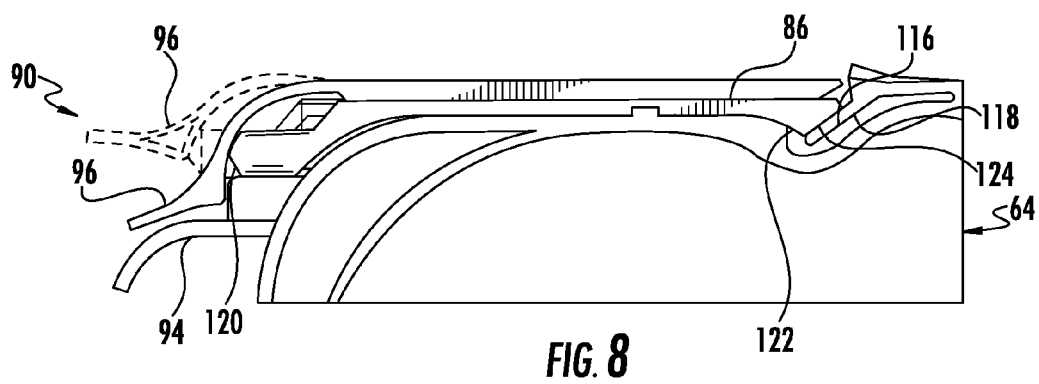

FIBER OPTIC MODULES WITH PUSHROD ACTIVATED LATCHES AND APPARATUSES FOR RELEASABLY ATTACHING FIBER OPTIC MODULES TO EQUIPMENT

RELATED APPLICATIONS

This application is a continuation of Application No. PCT/US13/72708 filed Dec. 3, 2013, which claims the benefit of priority to U.S. Provisional Application No. 61/734,655, filed Dec. 7, 2012 and U.S. Provisional Application No. 61/791,294, filed on Mar. 15, 2013, the content of which are relied upon and incorporated herein by reference in their entireties.

The present application is related to U.S. Provisional Patent Application Ser. No. 61/734,646, filed Dec. 7, 2012, which is incorporated herein by reference in its entirety.

The present application is related to U.S. Provisional Patent Application Ser. No. 61/791,341, filed Mar. 15, 2013, which is incorporated herein by reference in its entirety.

BACKGROUND

Field of the Disclosure

The technology of the disclosure relates to fiber optic modules and fiber optic modules that releasably latch to equipment racks or cabinets.

Technical Background

Benefits of optical fiber include extremely wide bandwidth and low noise transmission. Because of these advantages, optical fiber is increasingly being used for a variety of applications, including but not limited to, broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic connection equipment, which is also referred to as fiber optic equipment, is located in data distribution centers or central offices to support interconnections.

The fiber optic equipment is customized based on application need. The fiber optic equipment is typically included in housings that are mounted in equipment racks for organizational purposes and to optimize use of space. One example of such fiber optic equipment is a fiber optic module. A fiber optic module is designed to provide cable-to-cable fiber optic connections and manage the polarity of fiber optic cable connections. A fiber optic module may be mounted to a chassis or housing which is then mounted inside an equipment rack or cabinet. The fiber optic modules may also contain components including optical components. Due to increasing bandwidth needs and the need to provide a larger number of connections in data centers for increased revenue generating opportunities, a need exists to provide fiber optic modules that can facilitate larger numbers of fiber optic connections in a given space.

In order to facilitate larger numbers of fiber optic connections in a given space, fiber optic equipment supporting high-density fiber optic modules that support a high fiber optic connection density and bandwidth in a 1-U or 1-RU space (U and RU hereinafter referred to as "U") may be used. In this environment, high-density fiber optic modules have a limited form factor in order to fit in the small 1-U space, which limits the interior space of the high-density fiber optic modules. It may be advantageous to maximize the limited interior space of the high-density fiber optic modules.

SUMMARY OF THE DETAILED DESCRIPTION

Embodiments disclosed in the detailed description include an apparatus for releasably attaching a fiber optic module to equipment is disclosed. The apparatus comprises a latch configured to releasably attach the fiber optic module to equipment. The apparatus further comprises a pushrod configured to deactivate the latch from a back end of the fiber optic module, wherein the fiber optic module is released from the equipment. In one embodiment, the fiber optic module is a high-density fiber optic module. The pushrod may be further configured to maintain a position of the latch. The pushrod may also be further configured to be positioned in a groove disposed in a side of a main body of the fiber optic module, wherein a profile of the pushrod and groove are configured to prevent the pushrod from binding while moving within the groove.

The disclosed apparatus allows the fiber optic module to increase in size, e.g. elongate, such that its interior space may also be increased to accommodate optical components, including for example splice trays or fiber management features. In this way, the fiber optic module may be included in installations having smaller sized fiber optic modules, i.e., fiber optic modules not sized larger to include certain optical components, without requiring specific redesign of the rack, cabinet or equipment, or impacting the ability of the fiber optic module to be released from the rack.

In this regard, in another embodiment, a fiber optic module is disclosed that comprises an interior, wherein at least one adapter is disposed in one end of the fiber optic module having a fiber optic connector configured to connect to one or more optical fibers. The fiber optic module further comprises at least one fiber management feature provided within the interior of the fiber optic module, wherein the at least one fiber management feature is configured to provide fiber management for the one or more optical fibers within the interior of the fiber optic module. The fiber optic module may include a latch configured to releasably attach the fiber optic module to equipment. The fiber optic module may also include a pushrod configured to deactivate the latch from a back end of the fiber optic module.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 6 is a front, top perspective view of the exemplary fiber optic module of FIG. 5A with the cover removed showing the interior of the exemplary fiber optic module;

FIG. 7 is a detail perspective view of an exemplary embodiment of the pushrod of the exemplary fiber optic module of FIG. 5A;

FIG. 8 is a close-up view of a portion of the back end of the exemplary fiber optic module of FIG. 5A showing a pinch grip and the pushrod in an activated state with the deactivated state shown in background;

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein. Whenever possible, like reference numbers will be used to refer to like components or parts.

Embodiments disclosed in the detailed description include an apparatus for releasably attaching a fiber optic module to equipment is disclosed. The apparatus comprises a latch configured to releasably attach the fiber optic module to equipment. The apparatus further comprises a pushrod configured to deactivate the latch from a back end of the fiber optic module, wherein the fiber optic module is released from the equipment. In one embodiment, the fiber optic module is a high-density fiber optic module. The pushrod may be further configured to maintain a position of the latch. The pushrod may also be further configured to be positioned in a groove disposed in a side of a main body of the fiber optic module, wherein the pushrod and the groove are configured to prevent the pushrod from binding while moving within the groove.

The disclosed apparatus allows the fiber optic module to increase in size, e.g. elongate, such that its interior space may also be increased to accommodate optical components, including for example splice trays or fiber management features. In this way, the fiber optic module may be included in installations having smaller sized fiber optic modules, i.e., fiber optic modules not sized larger to include certain optical components, without requiring specific redesign of the rack, cabinet or equipment, or impacting the ability of the fiber optic module to be released from the rack.

In this regard, in another embodiment, a fiber optic module is disclosed that comprises an interior, wherein at least one adapter is disposed in one end of the fiber optic module having a fiber optic connector configured to connect to one or more optical fibers. The fiber optic module further comprises at least one fiber management feature provided within the interior of the fiber optic module, wherein the at least one fiber management feature is configured to provide fiber management for the one or more optical fibers within the interior of the fiber optic module. The fiber optic module may include a latch configured to releasably attach the fiber optic module to equipment. The fiber optic module may also include a pushrod configured to deactivate the latch from a back end of the fiber optic module.

Figure 1:
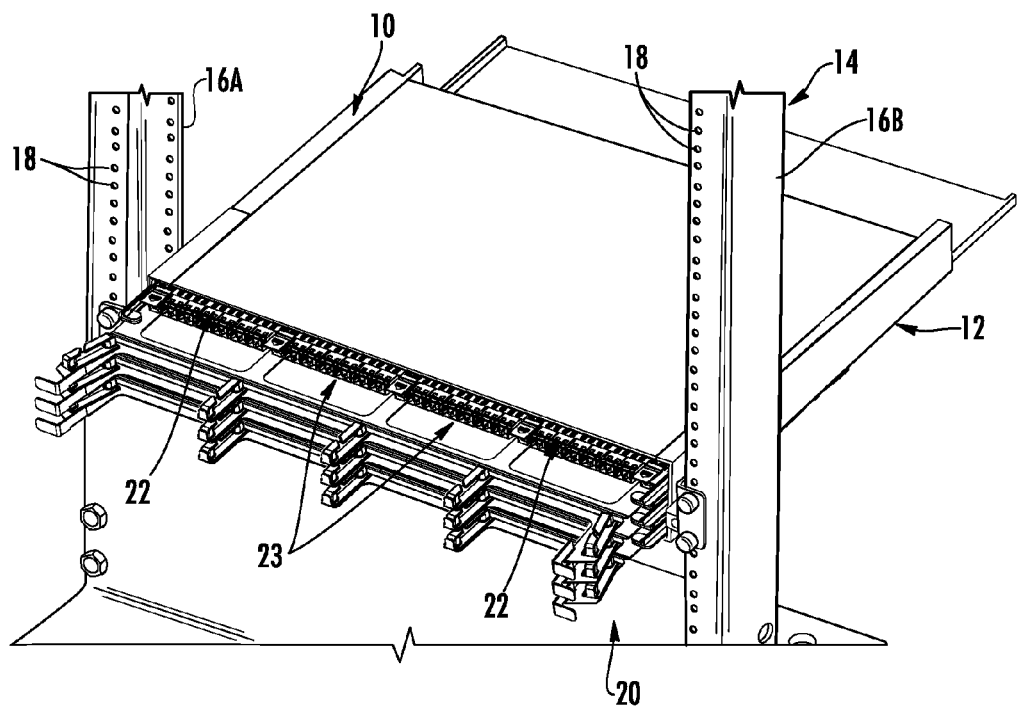
FIG. 1 is a front perspective view of an exemplary fiber optic equipment rack with an installed exemplary 1-U size chassis supporting high-density fiber optic modules to provide a given fiber optic connection density and bandwidth capability, according to one embodiment.

Before discussing in detail the embodiments of the fiber management features provided in the interior of high-density fiber optic modules, a brief discussion of high-density fiber optic modules may be beneficial. In this regard, FIG. 1 illustrates exemplary 1-U or 1-RU size fiber optic equipment 10 from a front perspective view. The fiber optic equipment 10 supports high-density fiber optic modules that support a high fiber optic connection density and bandwidth in a 1-U or 1-RU space (U and RU hereinafter referred to as "U"), as will be described in greater detail below. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more fiber optic modules. However, the fiber optic equipment 10 could also be adapted to support one or more fiber optic patch panels or other fiber optic equipment that supports fiber optic components and connectivity.

The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the chassis 12 inside the fiber optic equipment rack 14. The chassis 12 is attached and supported by the fiber optic equipment rack 14 in the form of shelves that are stacked on top of each other within the vertical rails 16A, 16B. As illustrated, the chassis 12 is attached to the vertical rails 16A, 16B. The fiber optic equipment rack 14 may support 1-U or 1-RU sized shelves, with "U" or "RU" equal to a standard 1.75 inches in height and nineteen (19) inches in width. In certain applications, the width of "U" may be twenty-three (23) inches. In this embodiment, the chassis 12 is 1-U in size; however, the chassis 12 could be provided in a size greater than 1-U as well.

As will be discussed in greater detail later below, the fiber optic equipment 10 includes a plurality of extendable fiber optic equipment trays 20 that each carries one or more fiber optic modules 22. The chassis 12 and fiber optic equipment trays 20 support fiber optic modules 22 that support a high fiber optic connection density and a high number of bandwidth connections in a given space, including in a 1-U space. FIG. 1 shows exemplary fiber optic components 23 disposed in the fiber optic modules 22 that support fiber optic connections. For example, the fiber optic components 23 may be fiber optic adapters or fiber optic connectors. As will also be discussed in greater detail later below, the fiber optic modules 22 in this embodiment can be provided such that the fiber optic components 23 can be disposed through at least eighty-five percent (85%) of the width of the front end 72 or face of the fiber optic module 22, as an example. This fiber optic module 22 configuration may provide a front opening of approximately 90 millimeters (mm) or less wherein fiber optic components 23 can be disposed through the front opening and at a fiber optic connection density of at least one fiber optic connection per 7.0 mm of width of the front opening of the fiber optic modules 22 for simplex or duplex fiber optic components 23. In this example, six (6) duplex or twelve (12) simplex fiber optic components 23 may be installed in each fiber optic module 22. The fiber optic equipment trays 20 in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if six (6) duplex fiber optic components 23 were disposed in each of the twelve (12) fiber optic modules 22 installed in fiber optic equipment trays 20 of the chassis 12 as illustrated in FIG. 1, a total of one hundred forty-four (144) fiber optic connections, or seventy-two (72) duplex channels (i.e., transmit and receive channels), would be supported by the chassis 12 in a 1-U space. If five (5) duplex fiber optic adapters are disposed in each of the twelve (12) fiber optic modules 22 installed in fiber optic equipment trays 20 of the chassis 12, a total of one hundred twenty (120) fiber optic connections, or sixty (60) duplex channels, would be supported by the chassis 12 in a 1-U space. The chassis 12 also supports at least ninety-eight (98) fiber optic components in a 1-U space wherein at least one of the fiber optic components is a simplex or duplex fiber optic component.

If multi-fiber fiber optic components were installed in the fiber optic modules 22, such as Multiple-Fiber Push-on/Pull-off (MPO) components for example, higher fiber optic connection density and bandwidths would be possible over other chassis 12 that use similar fiber optic components. For example, if up to four (4) twelve (12) fiber MPO fiber optic components were disposed in each fiber optic module 22, and twelve (12) of the fiber optic modules 22 were disposed in the chassis 12 in a 1-U space, the chassis 12 would support up to five hundred seventy-six (576) fiber optic connections in a 1-U space. If up to four (4) twenty-four (24) fiber MPO fiber optic components were disposed in each fiber optic module 22, and twelve (12) of the fiber optic modules 22 were disposed in the chassis 12 in a 1-U space, the chassis 12 would support up to one thousand one hundred fifty-two (1152) fiber optic connections in a 1-U space.

Figure 2:
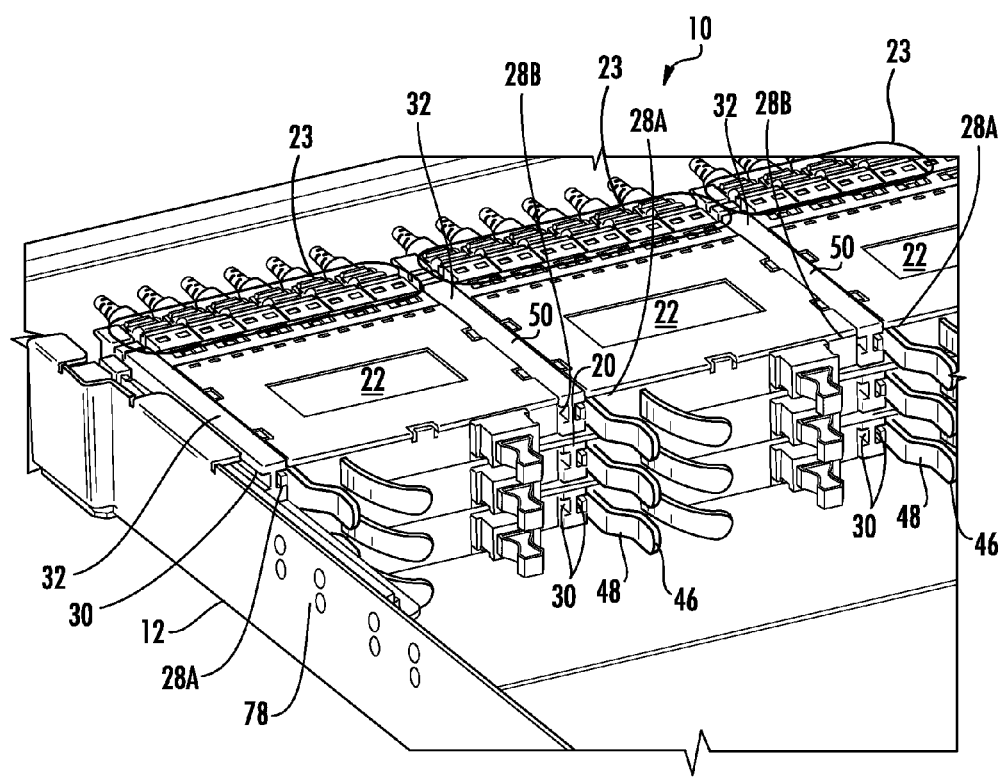
FIG. 2 is a rear perspective close-up view of the chassis of FIG. 1 with fiber optic modules installed in fiber optic equipment trays installed in the fiber optic equipment.

FIG. 2 is a rear perspective close-up view of the chassis 12 of FIG. 1 with fiber optic modules 22 loaded with fiber optic components 23 and installed in fiber optic equipment trays 20 installed in the chassis 12. Module rails 28A, 28B are disposed on each side of each fiber optic module 22. The module rails 28A, 28B are configured to be inserted within tray channels 30 of module rail guides 32 disposed in the fiber optic equipment tray 20, as illustrated in more detail in FIG. 3. Note that any number of module rail guides 32 can be provided. The fiber optic module 22 can be installed from both a front end 34 and a rear end 36 of the fiber optic equipment tray 20 in this embodiment. If it is desired to install the fiber optic module 22 in the fiber optic equipment tray 20 from the rear end 36, a front end 33 of the fiber optic module 22 can be inserted into the rear end 36 of the fiber optic equipment tray 20. More specifically, the front end 33 of the fiber optic module 22 is inserted into the tray channels 30 of the module rail guides 32. The fiber optic module 22 can then be pushed forward within the tray channels 30 until the fiber optic module 22 reaches the front end 34 of the module rail guides 32. The fiber optic modules 22 can be moved towards the front end 34 until the fiber optic modules 22 reach a stop or locking feature disposed in the front end 34.

Figure 3:
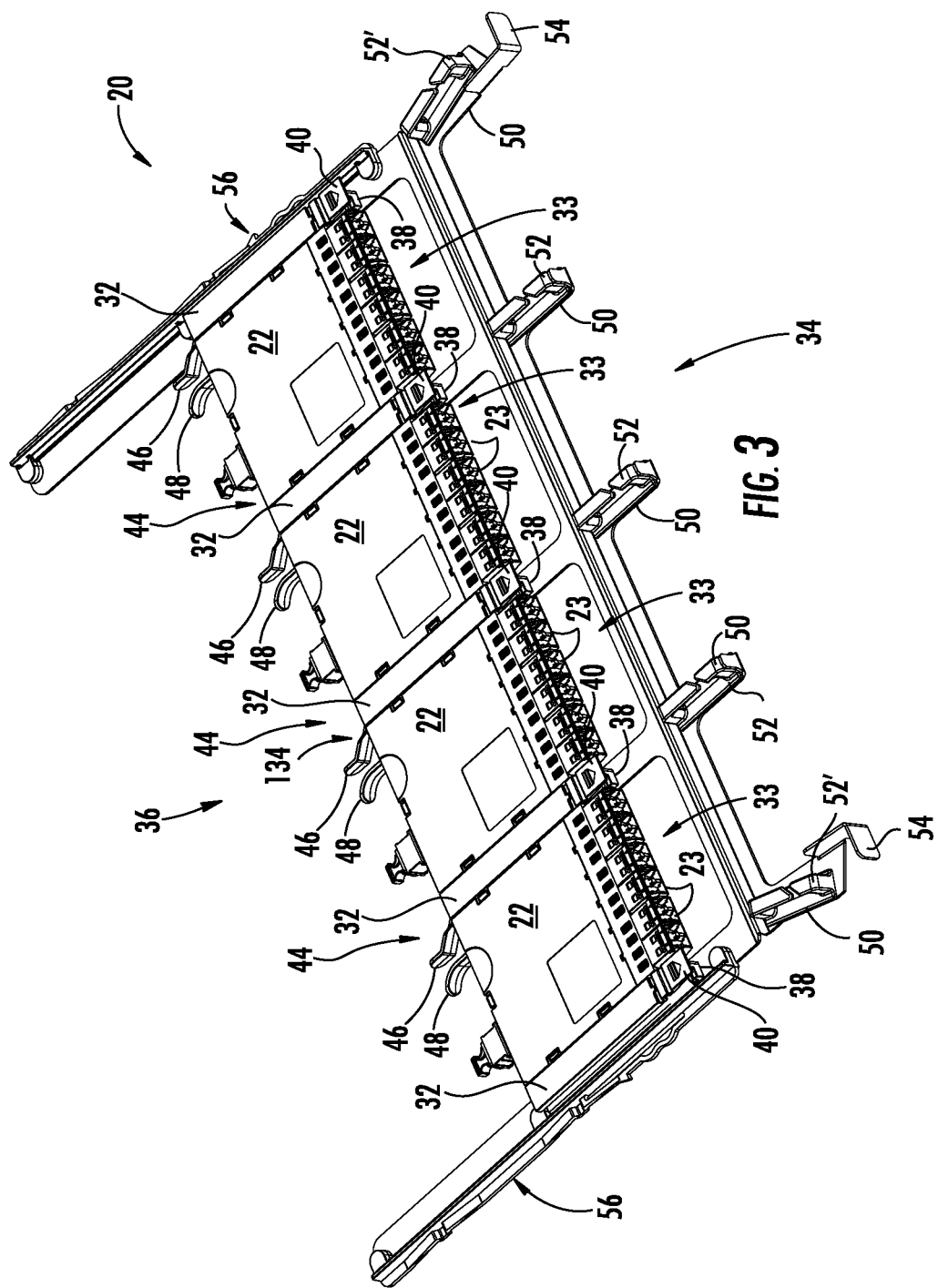
FIG. 3 is a front perspective view of one fiber optic equipment tray with installed fiber optic modules configured to be installed in the chassis of FIG. 1.

The fiber optic module 22 can be locked into place in the fiber optic equipment tray 20 by pushing the fiber optic module 22 forward to the front end 34 of the fiber optic equipment tray 20. A locking feature in the form of a front stop 38 is disposed in the module rail guides 32, as illustrated in FIG. 3. The front stop 38 prevents the fiber optic module 22 from extending beyond the front end 34. When it is desired to remove a fiber optic module 22 from the fiber optic equipment tray 20, a front module tab 40 also disposed in the module rail guides 32 and coupled to the front stop 38 can be pushed downward to contact the front stop 38. As a result, the front stop 38 will move downward away from the fiber optic module 22 such that the fiber optic module 22 is not obstructed from being pulled forward. The fiber optic module 22, and in particular its module rails 28A, 28B (FIG. 2), can be pulled forward along the module rail guides 32 to remove the fiber optic module 22 from the fiber optic equipment tray 20.

The fiber optic module 22 can also be removed from the rear end 36 of the fiber optic equipment tray 20. To remove the fiber optic module 22 from the rear end 36 of the fiber optic equipment tray 20, a latch 44 is disengaged by pushing a lever 46 (see FIGS. 2 and 3) inward towards the fiber optic module 22 to release the latch 44 from the module rail guide 32. To facilitate pushing the lever 46 inward towards the fiber optic module 22, a finger hook 48 is provided adjacent to the lever 46 so the lever 46 can easily be squeezed into the finger hook 48 by a thumb and an index finger.

With continuing reference to FIG. 3, the fiber optic equipment tray 20 may also contain extension members 50. Routing guides 52 may be conveniently disposed on the extension members 50 to provide routing for optical fibers or fiber optic cables connected to fiber optic components 23 disposed in the fiber optic modules 22 (FIG. 3). The routing guides 52' on the ends of the fiber optic equipment tray 20 may be angled with respect to the module rail guides 32 to route optical fibers or fiber optic cables at an angle to the sides of the fiber optic equipment tray 20. Pull tabs 54 may also be connected to the extension members 50 to provide a means to allow the fiber optic equipment tray 20 to easily be pulled out from and pushed into the chassis 12.

As illustrated in FIG. 3, the fiber optic equipment tray 20 also contains tray rails 56. The tray rails 56 are configured to be received in tray guides 58 disposed in the chassis 12 to retain and allow the fiber optic equipment trays 20 to move in and out of the chassis 12. The fiber optic equipment trays 20 can be moved in and out of the chassis 12 by their tray rails 56 moving within the tray guides 58. In this manner, the fiber optic equipment trays 20 can be independently movable about the tray guides 58 in the chassis 12.

Figure 4:
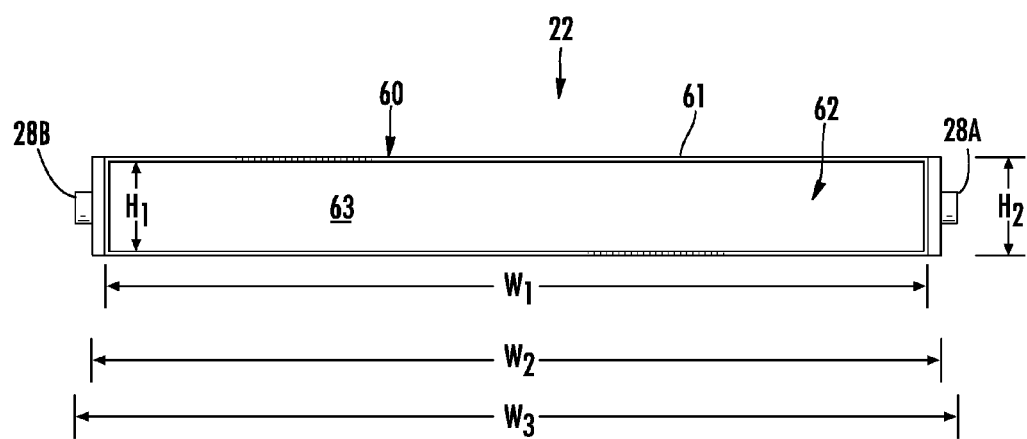
FIG. 4 illustrates a front view of an exemplary fiber optic module to illustrate the form factor of the fiber optic module.

FIG. 4 illustrates a front view of the fiber optic module 22 without loaded fiber optic components 23 in a front side 60 of a main body 61 of the fiber optic module 22 to further illustrate the form factor of the fiber optic module 22. A front opening 62 is disposed through the front side 60 of the main body 61 to receive the fiber optic components 23. An internal chamber 63 disposed inside the main body 61 is configured to receive or retain optical fibers or a fiber optic cable harness, The greater the width $W_1$ of the front opening 62, the greater the number of fiber optic components 23 that may be disposed in the fiber optic module 22. Greater numbers of fiber optic components 23 equates to more fiber optic connections, which supports higher fiber optic connectivity and bandwidth. However, the larger the width $W_1$ of the front opening 62, the greater the area required to be provided in the chassis 12 for the fiber optic module 22. Thus, in this embodiment, the width $W_1$ of the front opening 62 is designed to be at least eighty-five percent (85%) of the width $W_2$ of the front side 60 of the main body 61 of the fiber optic module 22. The greater the percentage of the width $W_1$ to width $W_2$, the larger the area provided in the front opening 62 to receive fiber optic components 23 without increasing width $W_2$. Width $W_3$, the overall width of the fiber optic module 22, may be 86.6 mm or 3.5 inches in this embodiment. As previously discussed, the fiber optic module 22 is designed such that four (4) fiber optic modules 22 can be disposed in a 1-U width space in the fiber optic equipment tray 20 in the chassis 12. The width of the chassis 12 is designed to accommodate a 1-U space width in this embodiment.

With three (3) fiber optic equipment trays 20 disposed in the 1-U height of the chassis 12, a total of twelve (12) fiber optic modules 22 can be supported in a given 1-U space. Supporting up to twelve (12) fiber optic connections per fiber optic module 22 as illustrated in the chassis 12 in FIG. 1 equates to the chassis 12 supporting up to one hundred forty-four (144) fiber optic connections, or seventy-two (72) duplex channels, in a 1-U space in the chassis 12 (i.e., twelve (12) fiber optic connections×twelve (12) fiber optic modules 22 in a 1-U space). Thus, the chassis 12 is capable of supporting up to one hundred forty-four (144) fiber optic connections in a 1-U space by twelve (12) simplex or six (6) duplex fiber optic adapters being disposed in the fiber optic modules 22. Supporting up to ten (10) fiber optic connections per fiber optic module 22 equates to the chassis 12 supporting one hundred twenty (120) fiber optic connections, or sixty (60) duplex channels, in a 1-U space in the chassis 12 (i.e., ten (10) fiber optic connections×twelve (12) fiber optic modules 22 in a 1-U space). Thus, the chassis 12 is also capable of supporting up to one hundred twenty (120) fiber optic connections in a 1-U space by ten (10) simplex or five (5) duplex fiber optic adapters being disposed in the fiber optic modules 22.

This embodiment of the chassis 12 and fiber optic module 22 disclosed herein can support a fiber optic connection density within a 1-U space wherein the area occupied by the fiber optic component 23 in twelve (12) fiber optic modules 22 in a 1-U space represents at least fifty percent (50%) of the total fiber optic equipment rack 14 area in a 1-U space (see FIG. 1). In the case of twelve (12) fiber optic modules 22 provided in a 1-U space in the chassis 12, the 1-U space is comprised of the fiber optic components 23 occupying at least seventy-five percent (75%) of the area of the front side 60 of the fiber optic module 22.

Two (2) duplexed optical fibers to provide one (1) transmission/reception pair can allow for a data rate of ten (10) Gigabits per second in half-duplex mode or twenty (20) Gigabits per second in full-duplex mode. Thus, with the above-described embodiment, providing at least seventy-two (72) duplex transmission and reception pairs in a 1-U space employing at least one duplex or simplex fiber optic component can support a data rate of at least seven hundred twenty (720) Gigabits per second in half-duplex mode in a 1-U space or at least one thousand four hundred forty (1440) Gigabits per second in a 1-U space in full-duplex mode if employing a ten (10) Gigabit transceiver. This configuration can also support at least six hundred (600) Gigabits per second in half-duplex mode in a 1-U space and at least one thousand two hundred (1200) Gigabits per second in full-duplex mode in a 1-U space, respectively, if employing a one hundred (100) Gigabit transceiver. This configuration can also support at least four hundred eighty (480) Gigabits per second in half-duplex mode in a 1-U space and nine hundred sixty (960) Gigabits per second in full-duplex mode in a 1-U space, respectively, if employing a forty (40) Gigabit transceiver. At least sixty (60) duplex transmission and reception pairs in a 1-U space can allow for a data rate of at least six hundred (600) Gigabits per second in a 1-U space in half-duplex mode or at least one thousand two hundred (1200) Gigabits per second in a 1-U space in full-duplex mode when employing a ten (10) Gigabit transceiver. At least forty nine (49) duplex transmission and reception pairs in a 1-U space can allow for a data rate of at least four hundred eighty-one (481) Gigabits per second in half-duplex mode or at least nine hundred sixty-two (962) Gigabits per second in a 1-U space in full-duplex mode when employing a ten (10) Gigabit transceiver.

The width $W_1$ of front opening 62 could be designed to be greater than eighty-five percent (85%) of the width $W_2$ of the front side 60 of the main body 61 of the fiber optic module 22. For example, the width $W_1$ could be designed to be between ninety percent (90%) and ninety-nine percent (99%) of the width $W_2$. As an example, the width $W_1$ could be less than ninety (90) mm. As another example, the width $W_1$ could be less than eighty-five (85) mm or less than eighty (80) mm. For example, the width $W_1$ may be eighty-three (83) mm and width $W_2$ may be eighty-five (85) mm, for a ratio of width $W_1$ to width $W_2$ of 97.6%. In this example, the front opening 62 may support twelve (12) fiber optic connections in the width $W_1$ to support a fiber optic connection density of at least one fiber optic connection per 7.0 mm of width $W_1$ of the front opening 62. Further, the front opening 62 of the fiber optic module 22 may support twelve (12) fiber optic connections in the width $W_1$ to support a fiber optic connection density of at least one fiber optic connection per 6.9 mm of width $W_1$ of the front opening 62.

Further as illustrated in FIG. 4, height $H_1$ of front opening 62 could be designed to be at least ninety percent (90%) of height $H_2$ of the front side 60 of the main body 61 of the fiber optic module 22. In this manner, the front opening 62 has sufficient height to receive the fiber optic components 23, and such that three (3) fiber optic modules 22 can be disposed in a 1-U space height. As an example, height $H_1$ could be twelve (12) mm or less or ten (10) mm or less. As an example, height $H_1$ could be ten (10) mm and height $H_2$ could be eleven (11) mm (or 7/16 inches), for a ratio of height $H_1$ to width $H_2$ of 90.9%.

The high-density fiber optic modules disclosed above provide larger numbers of fiber optic connections in a given space. However, due to the reduced form factor, the space in the interior of some high-density fiber optic modules is limited. This limited space means that certain high-density fiber optic modules may not be able to easily support certain functionalities, such as fiber splicing of fiber optic pigtail fibers to trunk optical fibers coming from the customer premise equipment. The embodiments disclosed herein allow the interior space of the high-density fiber optic modules to be maximized, allowing for a high-density fiber optic module to support splicing of pre-connectorized pigtail fibers within the high-density fiber optic module. In this manner, the high-density fiber optic module disclosed herein can retain its limited form factor and other functionalities while also adding the functionality of a fiber splice tray. Using the embodiments disclosed herein allows a user to splice fiber optic pigtails to trunk optical fibers while maintaining the port density of the high-density fiber optic module.

In this regard, a high-density fiber optic module is disclosed having a latch for releasably latching the fiber optic module to a rack or cabinet and a pushrod allowing for the release of the latch from the back end of the fiber optic module. The pushrod is used to allow the high-density fiber optic module to be longer than a standard fiber optic module, which provides for more interior space within the high-density fiber optic module for splicing and other functions. The pushrod feature also allows a user to activate or deactivate the module latch from a rear of the housing of the high-density fiber optic module while maintaining the latch position of the standard fiber optic module, which allows the longer fiber optic module to retain the same feel as a standard fiber optic module. In this manner, the pushrod activated latch allows the fiber optic module to be longer, which permits the interior space of the fiber optic module to be maximized for fiber routing and splicing. This, in turn, allows the module and splice functions to be combined in a single fiber optic component.

Figure 5A:
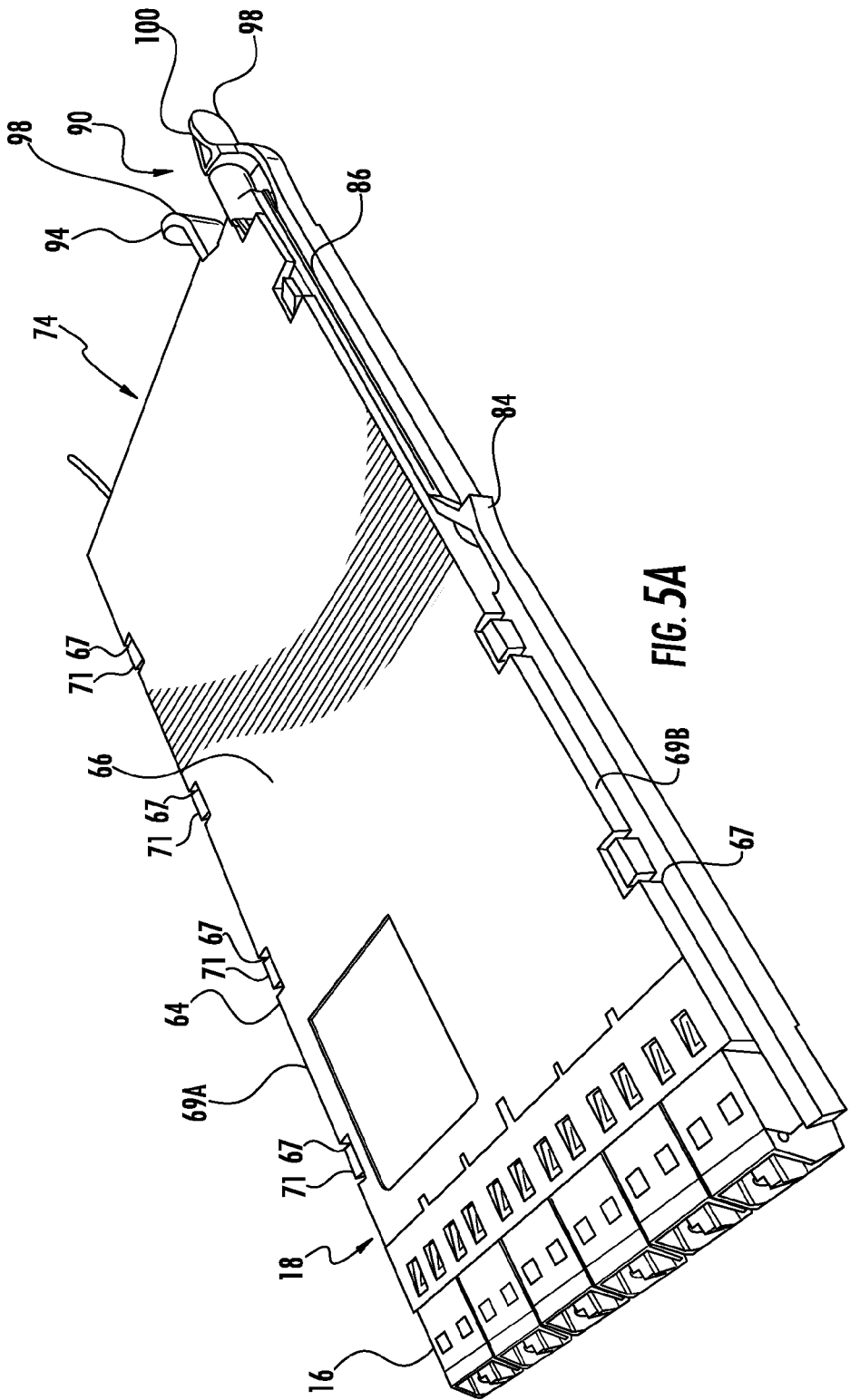
FIG. 5A is a front, top perspective view of an exemplary fiber optic module with a pushrod, according to an embodiment.
Figure 5B:
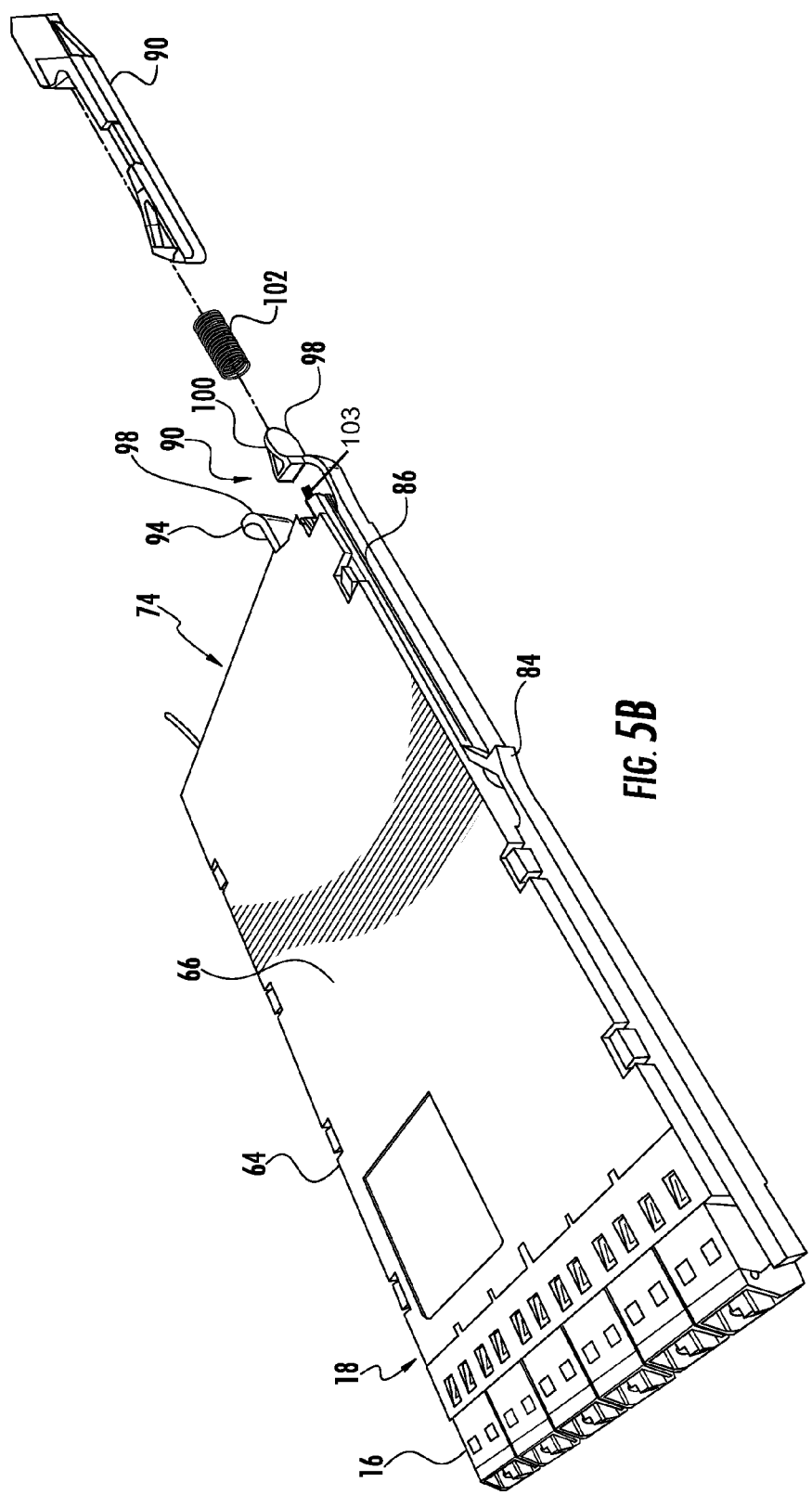
FIG. 5B is a front, top perspective view of an exemplary fiber optic module with a partially exploded view of the pushrod and a compression spring, according to one embodiment.

In this regard, FIGS. 5A, 5B, and 6 illustrate an exemplary fiber optic module 64 from a front perspective view. FIG. 5A illustrates the fiber optic module 64 with a cover 66 attached, while FIG. 5B illustrates the fiber optic module 64 with an exemplary pushrod assembly in partially exploded view. In one embodiment, the fiber optic module 64 is a high-density fiber optic module. In one embodiment, the fiber optic module 64 may be approximately eighty-four and a half millimeters (84.5 mm) in width, approximately one hundred and fifty millimeters (150 mm) in length, and approximately twelve millimeters (12 mm) in height.

FIG. 6 illustrates the fiber optic module 64 with the cover 66 removed showing an interior 68 of the fiber optic module 64. The fiber optic module 64 supports fiber optic adapters 70 mounted at a front end 72 of the fiber optic module 64. Although not shown in FIGS. 5A, 5B, and 6, fiber optic adapters 70 may be mounted at a back end 74 of the fiber optic module 64. The fiber optic adapters 70 may extend from an exterior of the fiber optic module 64 into the interior 68.

As can be seen in FIG. 6, optical fibers 76 connect to and extend from the fiber optic adapters 70 in the interior 68. The fiber optic module 64 is sized so as to allow optical components to be positioned in the interior 68. In this regard, the interior 68 provides optical fiber routing space 78, bend radius control 80, and splice holders 82.

With reference to FIGS. 5A, 5B, and 6, the cover 66 includes notches 67 disposed on sides 69A, 69B of the cover 66 that are configured to interlock with protrusions 71 disposed on sides 73A, 73B of a main body 77 of the fiber optic modules 64 when the cover 66 is attached to the main body 77 to secure the cover 66 to the main body 77. Although not shown in FIGS. 5A, 5B, and 6, the cover 66 may also contain notches 67 disposed on a front end 72 and back end 74, respectively, of the cover 66 that are configured to interlock with protrusions disposed in the front end 72 and the back end 74, respectively, of the main body 77 when the cover 66 is attached to the main body 77 to also secure the cover 66 to the main body 77.

With continuing reference to FIG. 6, the fiber optic components 70 are disposed through an opening in the front end 72. In this embodiment, the fiber optic components 70 are duplex LC adapters, which support single or duplex fiber connections and connectors. The duplex LC adapters may contain protrusions that are configured to engage with orifices disposed on the main body 77 to secure the duplex LC adapters in the main body 77. The optical fibers 76 are disposed in the optical fiber routing space 78 with fiber optic connectors 79 terminating on one end of the optical fibers 76 connected to the fiber optic adapters 70. Various fiber management features are disposed in the interior 68 of the fiber optic module 64, as illustrated in FIG. 6, to retain, manage, and control the looping of the optical fibers 76. Bend radius control 80 are used to maintain proper bend allowances for the optical fibers 76. In particular, the bend radius control 80 and the splice holders 82 are designed and positioned to allow for fiber routing within the fiber routing space 78 and to provide a bend radius R in the optical fibers 76 no greater than forty (40) mm, such as, for example twenty-five (25) mm or less. In one embodiment, the bend radius will be between approximately twenty (20) mm and approximately twenty-five (25) mm. The splice holder 82 is configured to be removable from the interior 68 of the fiber optic module 64 in one embodiment.

Additionally, the fiber optic module 64 has a releasable latch 84 and a pushrod 86. The pushrod 86 is positioned in a groove 88 disposed in a side 73B of the main body 77 of the fiber optic module 64. The profile of the pushrod 86 and groove 88 along with the selection of the materials used for the pushrod 86 and the groove 88 prevent the pushrod 86 from binding while maintaining the action of the standard length fiber optic modules. In one embodiment, the pushrod 86 may be made of Delrin® or other polyoxymethylene material, which is an engineering thermoplastic used in precision parts requiring high stiffness, low friction and excellent dimensional stability. In other embodiments, the pushrod 86 may be made of other plastics or made of metal.

The fiber optic module 64 may also have a pinch grip 90 disposed on one end of the fiber optic module 64. The pinch grip 90 is configured to activate the pushrod 86 when pressure is applied to the pinch grip 90. A simple to use cable entry strain relief mechanism 92 may be provided for trunk optical fibers coming into the fiber optic module 64 from the customer equipment. The pinch grip 90 has an arm 94 and a lever 96 each providing pinch surfaces 98, 100, respectively. In one embodiment, at least one of the arm 94 and the lever 96 may be textured on at least one surface to provide a better grip for the operator. The arm 94 may remain stationary while the lever 96 may be able to resiliently move toward and away from the arm 94. A detent 104 may be provided in the pinch grip 90 to prevent the two pinch surfaces 98, 100 from sliding with respect to each other, which will maximize the travel of the pushrod 86. It may be desirable for the two pinch surfaces 98, 100 not to move relative to each other, so that the travel of the pushrod 86 is maximized. The detent 104 may be in the form of complementary protrusion 105 and slot 106 (see FIGS. 10 and 11).

Referring back to FIG. 5B, the fiber optic module 64 is shown with an exemplary pushrod 86 assembly in partially exploded view. In one embodiment, a compression spring 102 is provided between the pushrod 86 and the fiber optic module 64. The compression spring 102 will fit on to one end of the pushrod 86 and over a guide post 103 connected to the fiber optic module 64. The compression spring 102 is captured in the first end 120 of the pushrod 86. A force of the compression spring 102 biases the pushrod 86 to one end of the groove 88. The compression spring 102 maintains the pushrod 86 in a latched position within the groove 88 in the fiber optic module 64.

Referring now to FIG. 7, there is shown a detail view of portion of a bottom 108 of the interior 68 of the fiber optic module 64 with the pushrod 86 in the groove 88. A wall 110 of the fiber optic module 64 has a stop 112 which positions in notch 114. The stop 112 stops the travel of the pushrod 86 and retains the pushrod 86 in the groove 88. The releasable latch 84 has a support member 128 attached to a side 130 of the module 64. The support member 128 is resiliently movable. Retention clip 116 and actuator 118 extend from the support member 128. The retention clip 116 may interact with an fiber optic equipment rack 14 or cabinet, or other equipment in the equipment rack or cabinet, as non-limiting examples, a chassis, tray or shelf, to releasably retain the fiber optic module 64.

Referring now also to FIG. 8, there is illustrated the pinch grip 90 and pushrod 86 in an activated state superimposed over a deactivated state. To be in the activated state, the pinch grip 90 may be manipulated by applying pressure to the lever 96, for example by a thumb or a finger, thereby moving the lever 96 toward the arm 94 until the pinch surfaces 98, 100 engage. At engagement, the protrusion 105 inserts into the slot 106. In this manner, the pinch surfaces 98, 100 remain in aligned contact during the activated state. The movement of the lever 96 applies force on a first end 120 of the pushrod 86 forcing the pushrod 86 to travel in the groove 88 toward the front end 72 of the fiber optic module 64. The pushrod 86 travels in the groove 88 until stop 112 stops the travel or the pinch surfaces 98, 100 make contact.

Figure 10:
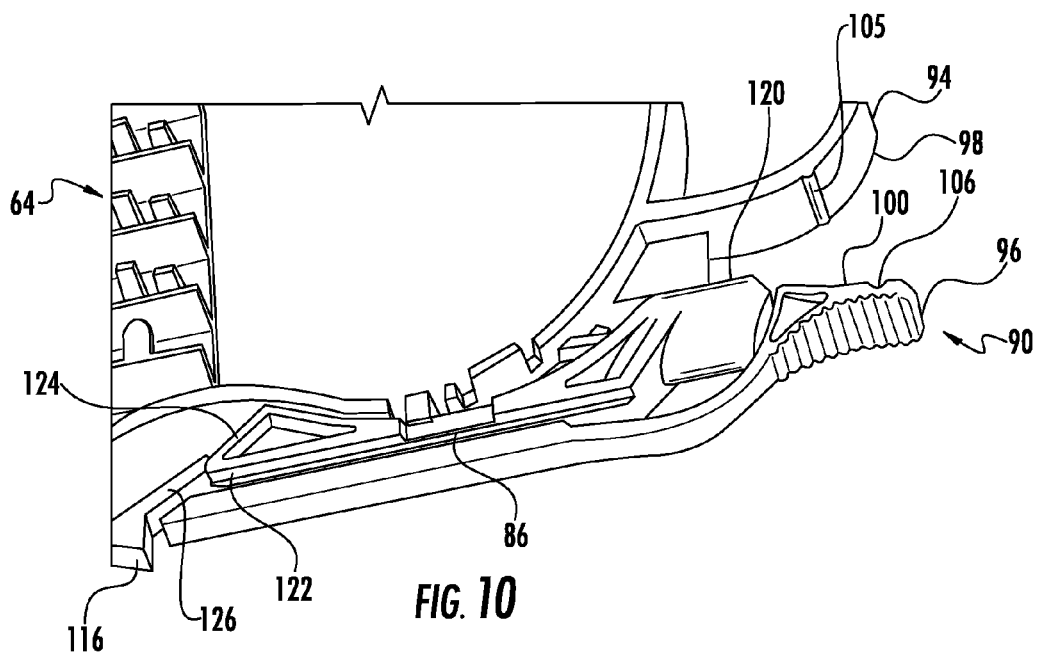
FIG. 10 is a detail view of a portion of an exemplary fiber optic module showing the pushrod and pinch grip.

Referring now to FIG. 10, the pushrod 86 has a second end 122. The second end 122 has a first angled surface 124 which contacts a complementary second angled surface 126 of the actuator 118. As the first angled surface 124 contacts the second angled surface 126, the first angled surface 124 applies pressure on the second angled surface 126 causing the support member 128 and, thereby, the retention clip 116 to move toward the interior 68 of the fiber optic module 64 and release the fiber optic module 64 from the equipment rack or cabinet or other equipment in which the fiber optic module 64 may be mounted. The pinch grip 90 may then be used to remove the fiber optic module 64 from the equipment rack or cabinet or other equipment in which it is mounted aided by the detent 104 keeping the pinch surface 98, 100 aligned.

Since the lever 96 is resiliently movable, releasing pressure on the pinch grip 90 allows the lever 96 to automatically move away from the arm 94 causing the protrusion 105 to remove from the slot 106 disengaging the pinch surfaces 98, 100. As the lever 96 moves away from the arm 94, force on the first end 120 of the pushrod 86 is released which also causes the release of pressure from the first angled surface 124 on the second angled surface 126. Because of the support member 128 is resiliently movable, releasing pressure by the first angled surface 124 against the second angled surface 126 allows the support member 128 to, and, thereby, the retention clip 116 to automatically move away from the interior 68 of the fiber optic module 64. Also, the movement of the support member 128 causes the second angled surface 126 to apply pressure on the first angled surface 124. This forces the pushrod 86 to travel toward the back end 74 of the fiber optic module 64 and into the deactivated state.

Figure 9A:
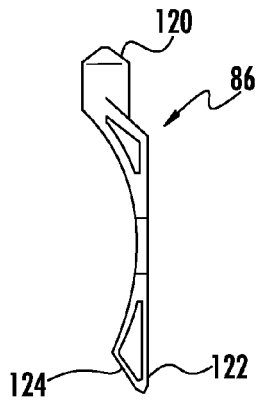
FIGS. 9A-9C are detail views of an exemplary pushrod.
Figure 9B:
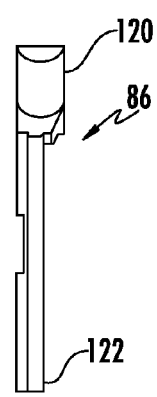
Figure 9C:
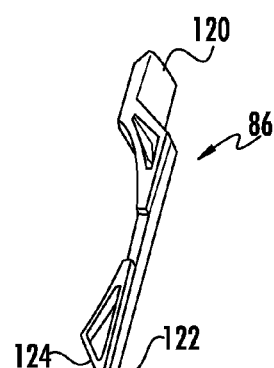

Referring now to FIGS. 9A, 9B, and 9C, there are shown detail views of the pushrod 86 from the top, side and front perspective, respectively.

Figure 11:
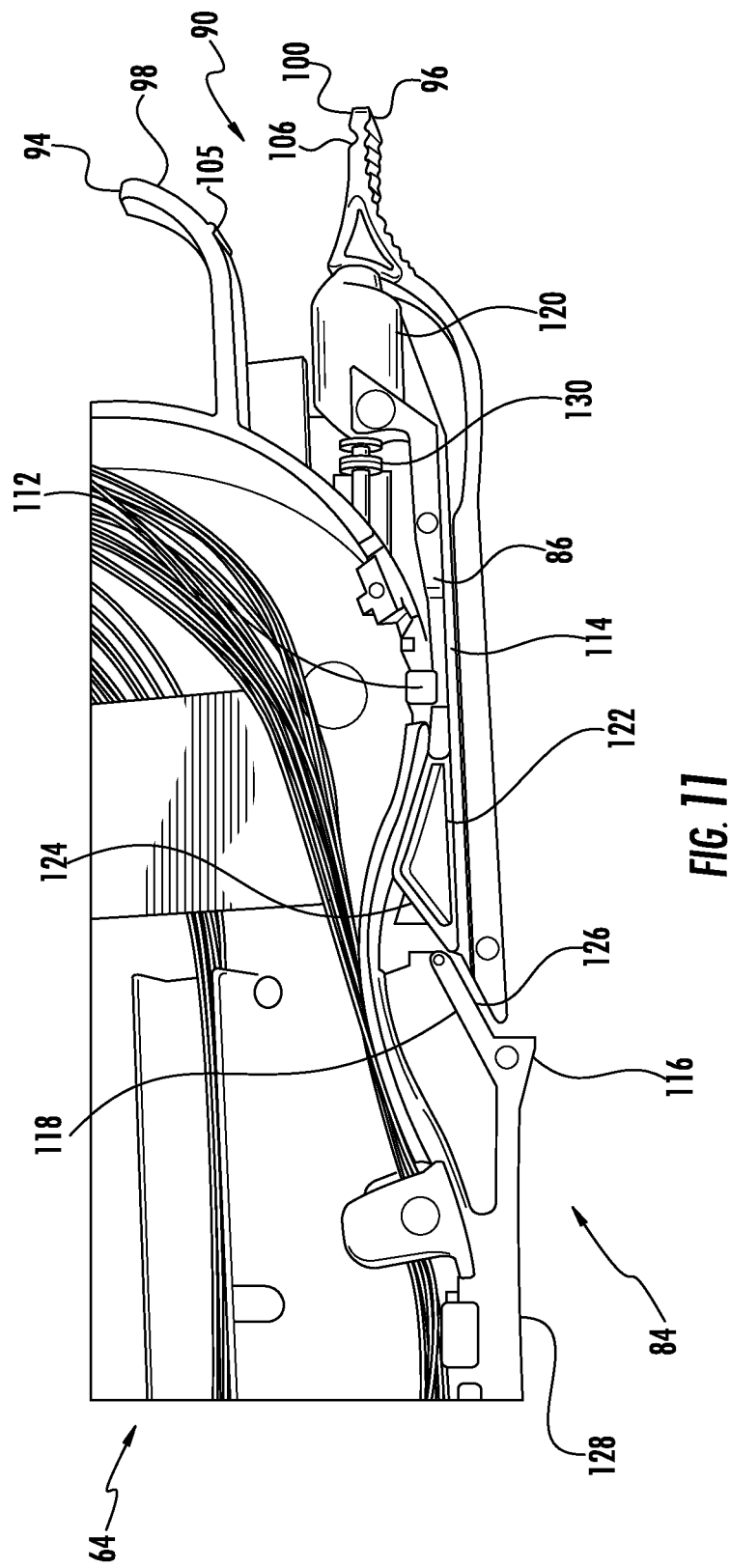
FIG. 11 is a detail view of a portion of an exemplary fiber optic module showing the pushrod and pinch grip.

Referring now to FIGS. 10 and 11, there are shown embodiments of the fiber optic module 64 with the pushrod 86 and pinch grip 90, in the deactivated state. In FIG. 11, a spring member 130 biases against the first end 120 of the pushrod 86 to move the pushrod 86 back to a deactivated state.

In this manner, the pushrod is used to allow the high-density fiber optic module to be longer than a standard fiber optic module, which provides for more interior space within the high-density fiber optic module for splicing and other functions. The pushrod feature also allows a user to activate or deactivate the module latch from a rear of the housing of the high-density fiber optic module while maintaining the latch position of the standard fiber optic module, which allows the longer fiber optic module to retain the same feel as a standard fiber optic module. In this manner, the pushrod activated latch allows the fiber optic module to be longer, which permits the interior space of the fiber optic module to be maximized for fiber routing and splicing. This, in turn, allows the module and splice functions to be combined in a single fiber optic component.

Other features that allow the interior space of the fiber optic module to be maximized for fiber routing and splicing, which, in turn, allows the module and splice functions to be combined in a single fiber optic component are now disclosed. These other features include various fiber management features within the interior of the high-density fiber optic module.

Figure 12:
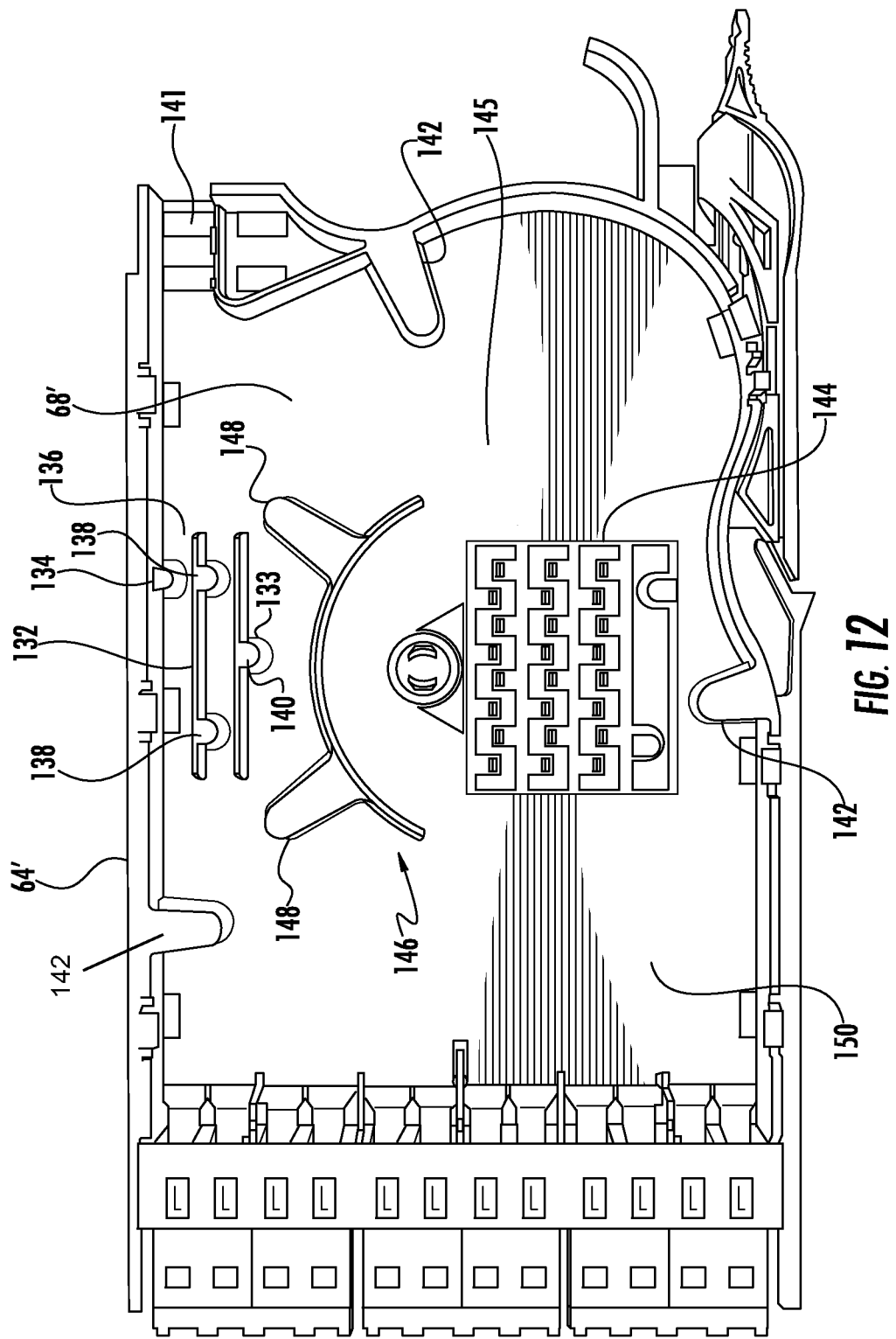
FIG. 12 is a top view of an exemplary fiber optic module showing exemplary fiber management features.

In this regard, reference is made now to FIG. 12, which illustrates another embodiment of a fiber optic module 64' in which the cover is removed showing an interior 68'. At least one fiber management feature is provided within the interior 68' to assist in fiber management within the fiber optic module 64'. A plurality of fiber management features according to one embodiment may be mounted in the interior 68' as shown in FIG. 12. One exemplary fiber management feature is a component holder. Referring to FIG. 12, a first component holder 132 and a second component holder 133 are shown. A retaining tab 134 is positioned on a side of the fiber optic module 64'. The first component holder 132 is spaced from a side of the fiber optic module 64' such that a fiber routing channel 136 is provided between the first component holder 132 and the retaining tab 134 positioned on a side of the fiber optic module 64'. The first component holder 132 has tabs 138 and the second component holder 133 has a tab 140 that aid in holding a fiber optic component, such as a ribbon furcation component or a splitter component. An incoming fiber optic cable feature 141 provides strain relief. One or more fiber management guides 142 are also shown in FIG. 12. In one embodiment, these fiber management guides 142 are disposed around an outer perimeter of the interior 68' of fiber optic module 64'. Although the embodiment shown in FIG. 12 shows three fiber management guides 142, additional fiber management guides 142 may be provided. In one embodiment, another fiber management guide 142 may be provided in the bottom right corner of the fiber optic module 64', near the latch.

With continued reference to FIG. 12, a splice holder assembly 144 is attached to a base 145 of the fiber optic module 64'. In one embodiment, the splice holder assembly 144 is removable from the fiber optic module 64'. Also included in the interior 68' of the fiber optic module 64' is a bend radius control 146 attached to a base 145 of the fiber optic module 64'. In one embodiment, as shown in FIG. 12, the bend radius control 146 has a plurality of tabs 148 which further aid in managing fiber routing. The interior 68' includes an area for fiber pigtail routing 150. In particular, the bend radius control 146 and the other fiber management features positioned within the interior 68' of the fiber optic module 64' and the distance between them are designed to allow for fiber routing within the area for fiber pigtail routing 150 and to provide a bend radius R in the optical fibers routed within the fiber optic module of no greater than forty (40) mm and such as, for example, twenty-five (25) mm or less. In one embodiment, the bend radius will be between approximately twenty (20) mm and approximately twenty-five (25) mm. The splice holder assembly 144 is configured to be removable from the interior 68' of the fiber optic module 64 in one embodiment.

Figure 13A:
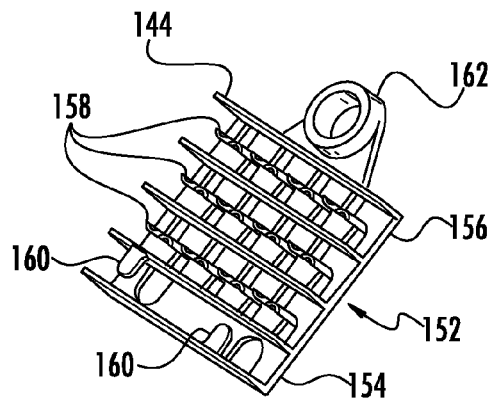
FIG. 13A-13D are detail views of an exemplary splice holder.
Figure 13B:
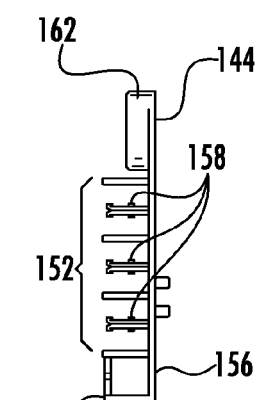
Figure 13C:
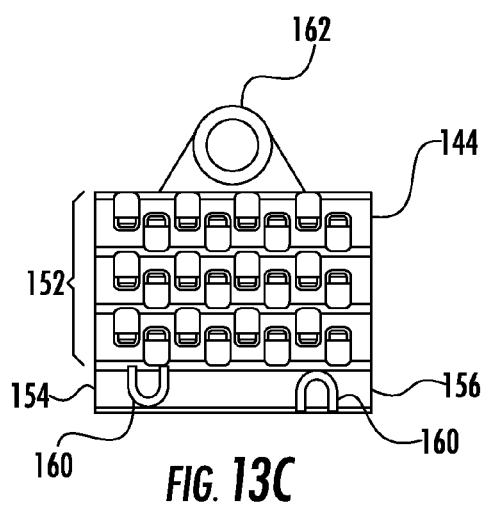

Referring now to FIGS. 13A-13C, there are shown detail views of the splice holder assembly 144 from top, side and front perspective, respectively. The splice holder assembly 144 is shown as having a single fiber splice holder assembly 152 and one ribbon splice holder feature 154 on a common base 156. The single fiber splice holder assembly 152 may have any number of single fiber splice holders 158. Each of the single fiber splice holders 158 may hold at least two single fiber splices, allowing for multiple splices to be held by the single fiber splice holder assembly 152. In one embodiment, the single fiber splice holder assembly 152 may be a 2×6 assembly. In this embodiment, the single fiber splice holder assembly 152 can hold up to twelve (12) single fiber splices, with the single fiber splices stacked two (2) deep in six (6) locations. The single fiber splice holders 158 extend from the base 156 in the single fiber splice holder assembly 152 and provides for a friction fit of the single fiber splice to retain the single fiber splice in the splice holder assembly 152. Tabs 160 retain a ribbon fiber splice in the ribbon splice holder feature 154 by providing a friction fit of the ribbon fiber splice to retain the ribbon fiber splice in the ribbon splice holder 154. Mounting feature 162 may be used to mount the splice holder assembly 144 to the interior 68' of module 64'.

Figure 13D:
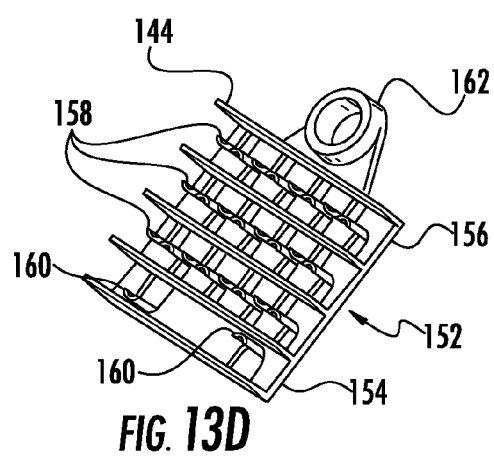

FIG. 13D is a detail view from the top of an alternate splice holder assembly 144. This splice holder assembly 144 is similar to the splice holder assembly 144 in FIG. 13A, with the tabs 160, instead of being straight, are formed in the shape of a downwardly curved finger having an arc, which helps retain the ribbon fiber splice in place. In addition, the curved finger is smooth on the bottom, which helps retain the ribbon fiber splice without pinching or damaging it. Thus, the tabs 160 may be formed in the shape of a downwardly curved finger having an arc and a rounded surface configured to retain the ribbon fiber splice in the ribbon fiber splice holder without pinching or damaging the ribbon fiber splice. In one embodiment, the tabs 160 have a downward arc of less than ninety (90) degrees.

Figure 14:
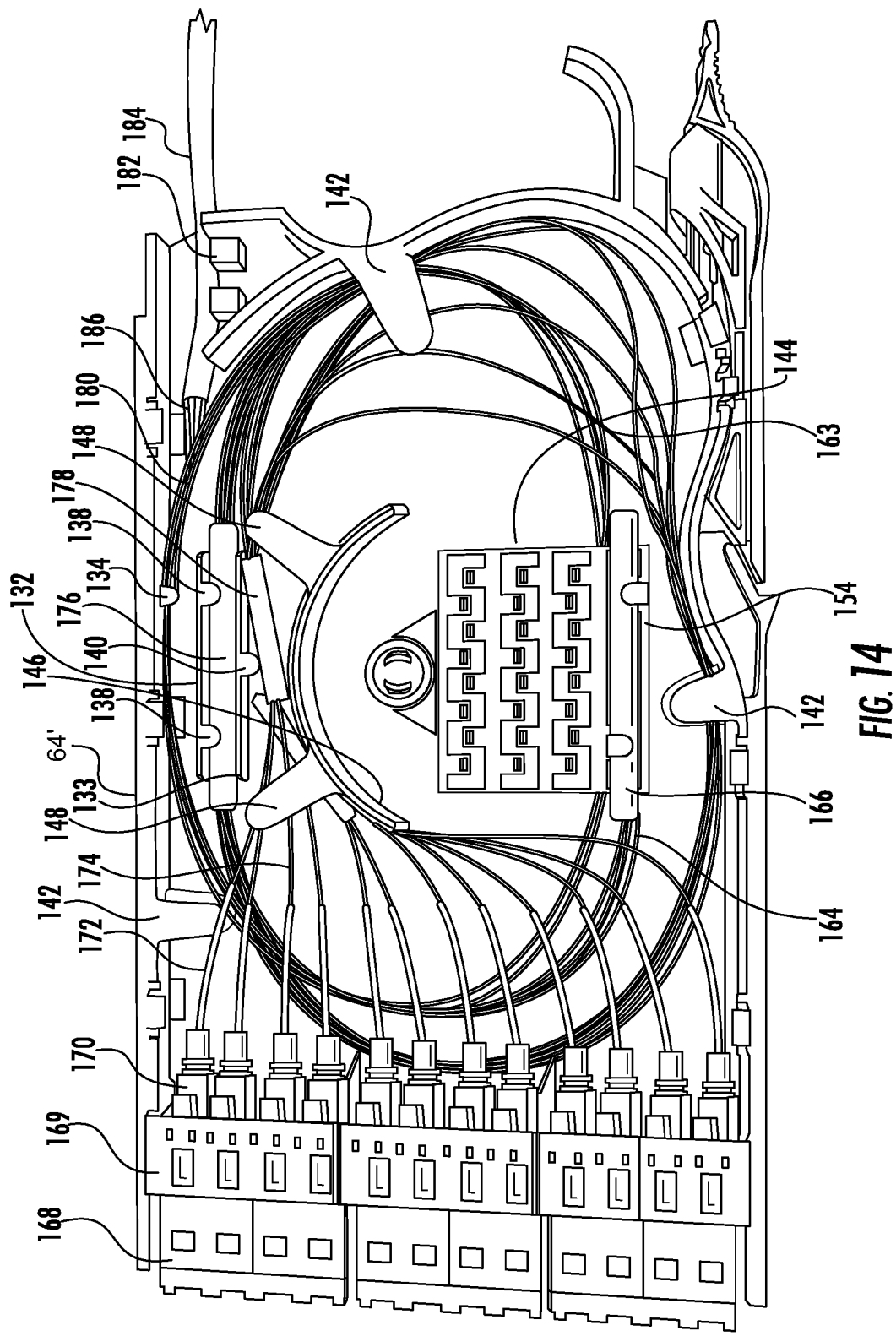
FIG. 14 is a top view of the exemplary fiber optic module of FIG. 12 with a ribbon harness and ribbon fiber splice.

FIG. 14 illustrates the fiber optic module 64' of FIG. 12 with a ribbon harness 163 spliced to a ribbon cable 164 by ribbon fiber splice 166 positioned in ribbon splice holder feature 154. In one embodiment, it may be a LC terminated, XB fiber ribbon harness spliced to a SMF ribbon cable. In this embodiment, certain fiber optic components may be preloaded in the fiber optic module 64' before the fiber optic module 64' is deployed in the field. At least one adapter 168 (the embodiment of FIG. 14 shows a plurality of adapters 168) is disposed though an opening in one end of the fiber optic module 64'. In one embodiment, the adapters 168 may be duplex LC adapters, which support single or duplex fiber connections and connectors. The adapters 168 may be configured to engage with orifices 169 disposed on the before the fiber optic module 64' to secure the adapters 168 to the fiber optic module 64'.

A ribbon harness 163 is disposed in the interior 68' of the fiber optic module 64' with fiber optic connectors 170 terminating one end of optical fibers (see, e.g. 172, 174) connected to the adapters 168. A additional ribbon fiber splice 176 is positioned and held in place by first component holder 132 and the second component holder 133, which in part is accomplished by the tabs 138 of the first component holder 132. Certain optical fibers 172, 174 are held together by a spiral tube 178 which is held between the tab 140 of the second component holder 133 and the bend radius control 146. The tabs 148 of the bend radius control 146 may also provide for fiber management. Additional fibers 180 may be held in place in the fiber routing channel 136 by the retaining tab 134. Additional fiber management is provided by fiber management guides 142 disposed around an outer perimeter of the fiber optic module 64'.

In one embodiment, the fiber management guides 142 are formed in the shape of a downwardly curved finger having an arc, which helps retain the optical fibers or ribbon fiber splice in place. In addition, the curved finger is smooth on the bottom, which helps retain a fiber optic component, such as an optical fibers or a ribbon fiber splice, without pinching or causing damage. Thus, the fiber management guides 142 may be formed in the shape of a downwardly curved finger having an arc and a rounded surface configured to retain a fiber optic component, such as an optical fibers or a ribbon fiber splice, without pinching or damaging them. In one embodiment, the fiber management guides 142 have a downward arc of less than ninety (90) degrees.

An incoming fiber optic cable feature 182 provides strain relief for an incoming trunk optical fiber cable 184 containing individual optical fibers 186.

In one embodiment, any of the fibers in the ribbon harness 163 or in the ribbon cable 164 may be a bend optimized fiber, such as, for example XB fiber, such as ClearCurve® Multimode fiber commercially available from Corning Incorporated. Using a bend optimized fiber may reduce the risk of optical attenuation at longer wavelengths.

Figure 15:
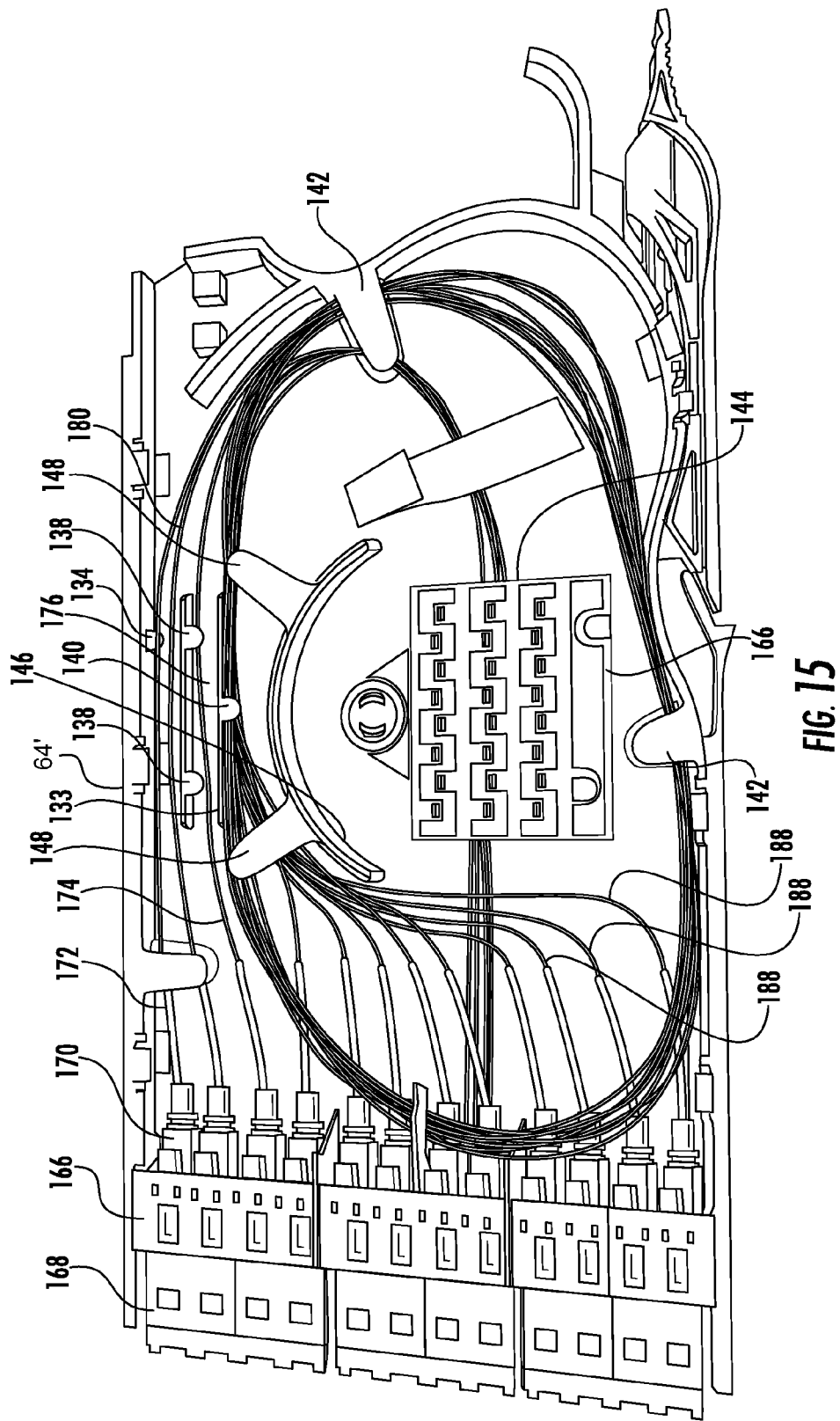
FIG. 15 is a top view of the exemplary fiber optic module of FIG. 12 with single fiber pigtails.

FIG. 15 illustrates the fiber optic module 64' of FIG. 12 with single fiber pigtails 188 routed therein. In one embodiment, the pigtails 188 may be pre-loaded into the fiber optic module 64 and are LC terminated, XB fiber pigtails. Various ones of the single fiber pigtails 188 are routed over various fiber management features. For example, one or more single fiber pigtails 188 are held in place by a fiber management guide 142 and routed through fiber routing channel 136 by retaining tab 134. Another single fiber pigtail 188 is routed to and held in place by a tab 138 of the first component holder 132. Additional single fiber pigtails 188 are routed over bend radius control 146 and held in place by the tab 140 of the second component holder 133 and a tab 148 of the bend radius control 146. Single fibers of the single fiber pigtails 188 are routed to and through the single fiber splice holders 158 of the single fiber splice holder assembly 152.

In this manner, the fiber management features shown in FIG. 14 and FIG. 15 allow a large number of various types of optical fibers to be managed in the small interior space of a high-density fiber optic module. The fiber management features disclosed herein allow the interior space of the high-density fiber optic modules to be maximized, allowing for the high-density fiber optic module to support splicing of pre-connectorized pigtail fibers within the high-density fiber optic module. In this manner, the high-density fiber optic module can retain its limited form factor and other functionalities while also adding the functionality of a fiber splice tray. Using the fiber management features disclosed herein allows a user to splice fiber optic pigtails to trunk optical fibers while maintaining the port density of the high-density fiber optic module.

Figure 16A:
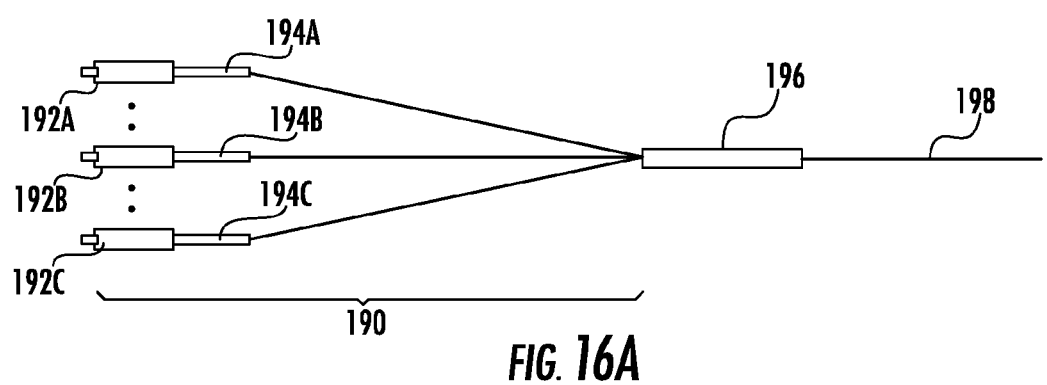
FIG. 16A illustrates one embodiment of a ribbon harness that may be employed in the fiber optic modules disclosed herein.

FIG. 16A illustrates one embodiment of a ribbon harness that may be employed in the high-density fiber optic modules disclosed herein. FIG. 16A shows pigtails 190, each terminated with a connector 192A, 192B, and 192C, respectively. In one embodiment, the pigtails 190 may be approximately fourteen and a half (14.5) inches long. The pigtails 190 may be a XB pigtail in one embodiment. Tubes 194A, 194B, and 194C are provided to protect the fibers in the pigtails 190 from being damaged if they are bent in order to be routed within the interior of the fiber optic module. In one embodiment, the tubes 194A, 194B, and 194C may be 900 um plastic tubes and may range from about 0.75 inches to about four (4) inches in length. A ribbon splice protector 196 may be provided for furcation, with a ribbon fiber 198 coming out of one end of the ribbon splice protector 196. In one embodiment, the ribbon splice protector 196 may be approximately one and a half (1.5) inches long. In one embodiment, the ribbon fiber 198 may be approximately sixteen and a half (16.5) inches long and may be a XB ribbon fiber.

Figure 16B:
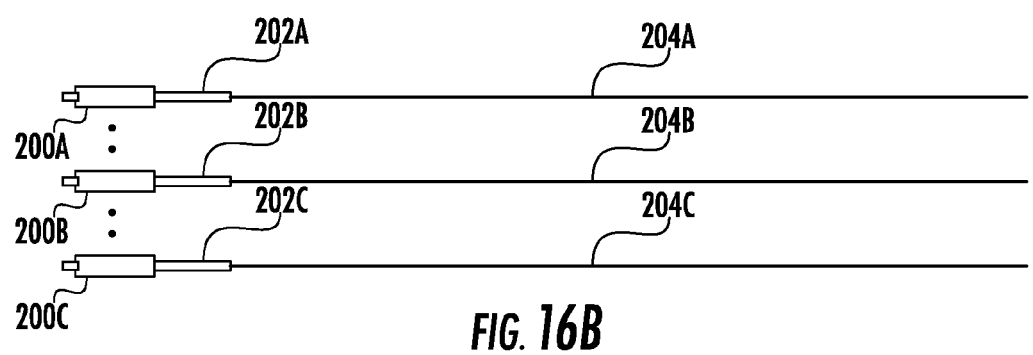
FIG. 16B illustrates one embodiment of fiber pigtails that may be employed in the fiber optic modules disclosed herein.

FIG. 16B illustrates one embodiment of pigtails that may be employed in the high-density fiber optic modules disclosed herein. FIG. 16B shows three pigtail fibers 204A, 204B, and 204C, with three connectors 200A, 200B, and 200C disposed at one end of the respective pigtail fibers, one for each fiber in the pigtail. In one embodiment, the pigtail fibers 204A, 204B, and 204C may be approximately thirty-three (33) inches long. The pigtail fibers 204A, 204B, and 204C may be XB pigtails in one embodiment. Tubes 202A, 202B, and 202C are provided to protect the pigtail fibers 204A, 204B, and 204C from being damaged if they are bent in order to be routed within the interior of the fiber optic module. In one embodiment, the tubes 202A, 202B, and 202C may be 900 um plastic tubes and may range from about 0.75 inches to about four (4) inches in length.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims.

It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic module comprising:
an interior;
at least one adapter disposed in one end of the fiber optic module having a fiber optic connector configured to connect to one or more optical fibers;
at least one fiber management feature provided within the interior of the fiber optic module;
wherein the at least one fiber management feature is configured to provide fiber management for the one or more optical fibers within the interior of the fiber optic module;
a latch configured to releasably attach the fiber optic module to equipment; and
a pushrod positioned in a groove disposed in a side of a main body of the fiber optic module, wherein the pushrod is configured to deactivate the latch from a back end of the fiber optic module;
a pinch grip disposed on one end of the fiber optic module, the pinch grip configured to actuate the pushrod when a pressure is applied to the pinch grip,
wherein the pinch grip has an arm and a lever, each providing a respective pinch surface.

2. The fiber optic module of claim 1, wherein the at least one fiber management feature comprises a plurality of fiber management features.

3. The fiber optic module of claim 1, wherein the at least one fiber management feature comprises a splice holder assembly positioned in the interior, wherein the splice holder assembly comprises a single fiber splice holder assembly and a ribbon fiber splice holder mounted on a common base.

4. The fiber optic module of claim 1, wherein the at least one fiber management feature comprises a bend radius control attached to the interior of the fiber optic module.

5. The fiber optic module of claim 4, wherein the bend radius control is configured to allow for fiber routing within the interior of the fiber optic module and to provide a bend radius of between approximately twenty (20) and twenty-five (25) millimeters (mm).

6. An apparatus for releasably attaching a fiber optic module to equipment, comprising:
a latch configured to releasably attach the fiber optic module to the equipment; and
a pushrod configured to deactivate the latch from a back end of the fiber optic module, wherein the fiber optic module is released from the equipment;
a pinch grip disposed on one end of the fiber optic module, the pinch grip configured to actuate the pushrod when a pressure is applied to the pinch grip,
wherein the pinch grip has an arm and a lever, each providing a respective pinch surface.

7. The apparatus of claim 6, wherein the pushrod is further configured to be positioned in a groove disposed in a side of a main body of the fiber optic module.

8. The apparatus of claim 7, wherein the pushrod and the groove are configured to prevent the pushrod from binding while moving within the groove.

9. The apparatus of claim 7, further comprising a compression spring configured to be placed on to one end of the pushrod and over a guide post connected to the fiber optic module, wherein the spring is captured in the one end of the pushrod and a force of the spring biases the pushrod toward one end of the groove.

10. The apparatus of claim 7, further comprising a stop provided in a notch disposed in a wall of the fiber optic module, wherein the stop is configured to stop a travel of the pushrod within the groove.

11. The apparatus of claim 6, further comprising a detent provided in the pinch grip, the detent configured to prevent the pinch surfaces from sliding, such that a travel of the pushrod within the groove is maximized.

12. The apparatus of claim 11, wherein the detent comprises a protrusion and a slot, the protrusion configured to be selectably insertable into the slot when a pressure is applied to the pinch grip.

13. The apparatus of claim 11, wherein the latch further comprises a resiliently moveable support member attached to a side of the fiber optic module.

14. The apparatus of claim 13, wherein a retention clip and an actuator extend from the resiliently moveable support member, the retention clip is configured to releasably maintain the fiber optic module in the equipment.

15. The apparatus of claim 14, wherein the pushrod has a first end and a second end, wherein when the lever is moved, the lever is configured to apply a force to the first end of the pushrod forcing the pushrod to travel in the groove toward a front end of the fiber optic module until the stop stops the pushrod or the pinch surfaces make contact.

16. The apparatus of claim 15, wherein when the lever is moved and the pushrod travels in the groove toward a front end of the fiber optic module, a first angled surface of the second end of the pushrod is configured to contact a complementary second angled surface of the actuator and is configured to apply a pressure to the complementary second angled surface, thereby causing the resiliently moveable support member, and in turn the retention clip, to move towards an interior of the fiber optic module and release the fiber optic module from the equipment.

17. The apparatus of claim 16, wherein the lever is configured to automatically move away from the arm when a pressure on the lever is released, causing the force on the first end of the pushrod to be released and a resulting release of pressure from the first angled surface against the complementary second angled surface.

18. The apparatus of claim 17, wherein the resulting release of pressure from the first angled surface against the complementary second angled surface allows the support member and the retention clip to automatically move away from the interior of the fiber optic module, wherein the second angled surface applies a pressure on the first angled surface, forcing the pushrod to travel toward a back end of the fiber optic module and into a deactivated state.

19. The apparatus of claim 6, wherein the pushrod is positioned outside an interior of the fiber optic module.

20. The apparatus of claim 6, wherein the pushrod is further configured to maintain a position of the latch.

21. The apparatus of claim 6, wherein the lever is configured to be resiliently moved toward the arm to activate the pushrod.

* * * * *